United States Patent [19]

Kobayashi

[11] Patent Number: 4,868,723
[45] Date of Patent: Sep. 19, 1989

[54] CAR NUMBER PLATE LAMP
[75] Inventor: Syoji Kobayashi, Shizuoka, Japan
[73] Assignee: Koito Manufacturing Co., Ltd., Tokyo, Japan
[21] Appl. No.: 126,375
[22] Filed: Nov. 30, 1987
[30] Foreign Application Priority Data
Nov. 28, 1986 [JP]  Japan ............................ 61-181985[U]
[51] Int. Cl.$^4$ .............................................. B60Q 1/00
[52] U.S. Cl. ...................... 362/80; 362/308; 362/326
[58] Field of Search ................ 40/204, 205, 208, 556, 40/560, 582; 362/326, 327, 328, 341, 347, 308, 80

[56] References Cited
U.S. PATENT DOCUMENTS
1,740,588  12/1929  Hamilton .............................. 40/204
3,064,378  11/1962  Onksen ................................. 40/204
3,761,957   9/1973  Jarrett ................................. 362/327

FOREIGN PATENT DOCUMENTS
657793  1/1929  France ................................. 40/582

Primary Examiner—Stephen F. Husar
Assistant Examiner—Sue Hagarman
Attorney, Agent, or Firm—Sughrue, Mion, Zinn, Macpeak and Seas

[57] ABSTRACT

A car number plate lamp having an improved illuminating efficiency and more uniform illuminating intensity. A light source and lens are provided in a lamp body, and a lens is mounted across an opening in the lamp body. The reflector is three-dimensionally curved in such a manner that the entire surface of the reflector viewed in the longitudinal direction curves circular-arcuately about the light source. The surface perpendicular to the longitudinal direction forms a paraboloid with the light source at the focal point. Concentric steps for refracting the light from the light source to the number plate are formed in the inner surface of the lens.

6 Claims, 3 Drawing Sheets

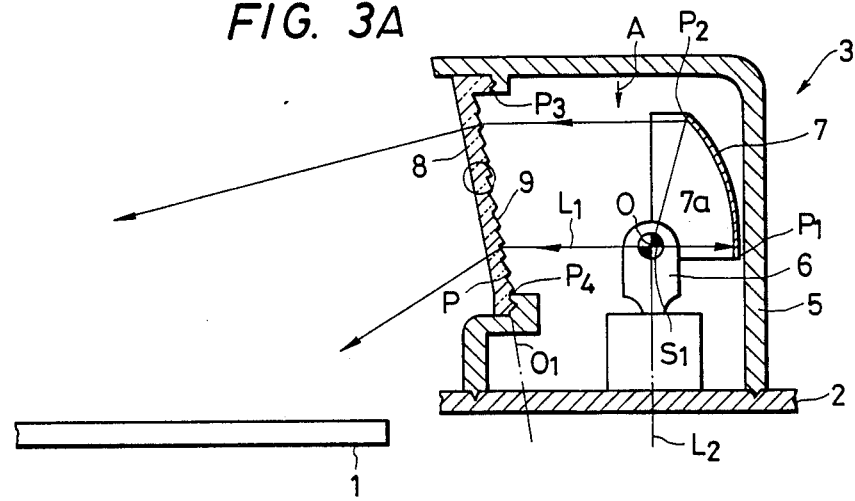
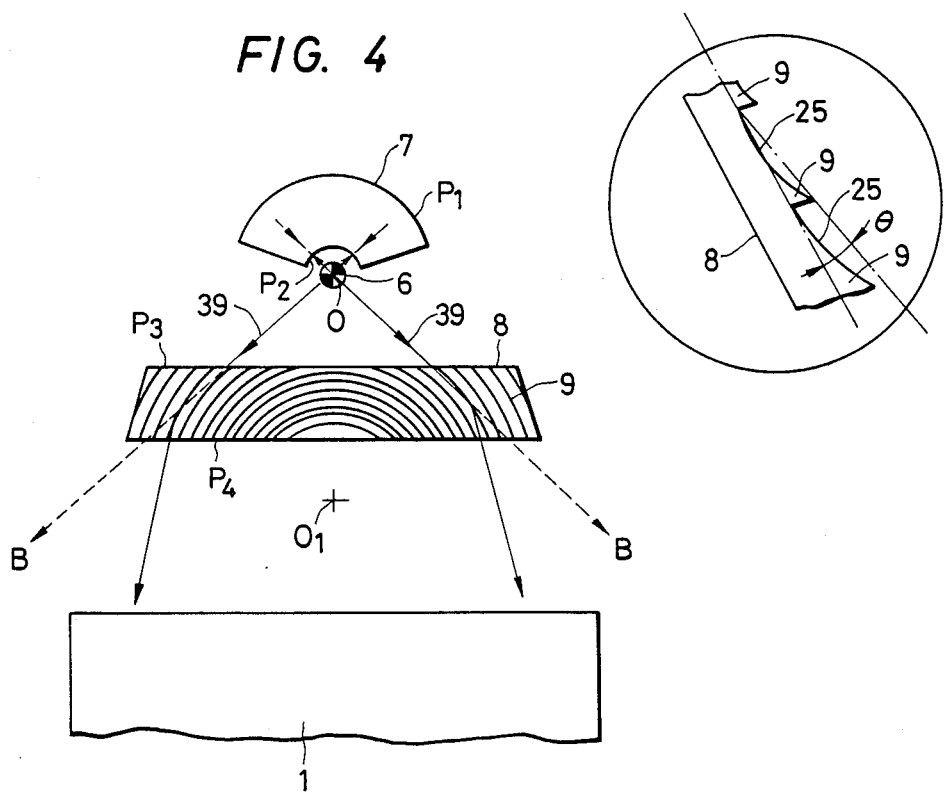

CAR NUMBER PLATE LAMP

BACKGROUND OF THE INVENTION

The present invention relates to a car number plate (license plate) illuminating lamp which is constructed so that the number plate can be illuminated uniformly and brightly over the entire surface thereof.

Conventionally, a car number plate lamp is generally arranged as shown in FIGS. 1A and 1B. That is, the number plate lamp is arranged to illuminate the number plate from a position above the number plate. In these figures, reference numeral 1 designates a number plate attached to the surface of a car body 2 at a designated position, and 3 designates a number plate lamp mounted at a position on the surface of the car body 2 above the number plate 1 and projecting outwardly from the surface of the car body. The number plate lamp 3 is constituted primarily by a lamp body 5 made of plastics or the like having an opening at its lower surface, a light source 6 disposed within the lamp body 5, a reflector 7, a transparent lens 8 closing the opening in the lamp body 5, and related components. The reflector 7 is curved in the form of a paraboloid of revolution, with the light source 6 at the focal point thereof, so that a part of the light radiated from the light source 6 is reflected by the paraboloid to obtain parallel rays 10a and 10b directed toward the lens 8. Steps 9 are formed over the entire inner surface of the lens 8 so that the parallel rays 10a, 10b, ... reflected by the reflector 7 are refracted toward the number plate 1.

The steps 9 of the lens 8 are constituted by straight ridges extending parallel to one another in the left-and-right direction (forward and backward direction), As a result, the refractive angle of the light radiated from the light source 6 and transmitted through the lens 8 is small. Accordingly, light 11 rays advancing slantingly leftward and downward as well as rightward and downward are ineffective in illuminating the number plate 1 and are wasted. Therefore, this structure suffers from ineffective use of light, making bright illumination difficult.

In order to make the irradiation of the entire surface of the number plate 1 as uniform as possible, a distance $l_1$ between the light source 6 and the plate 1 and a distance $l_2$ between the light source 6 and the car body 2 should be made large. If the distance $l_2$ is made too large, however, there is an aesthetics problem in that the light body 5 projects too far from the surface of the car body 2. Also, the upper portion of the number plate 1, which is the nearest to the light source 6, is more brightly lit than the lower portion, making difficult to read the number.

Particularly, as illustrated in FIG. 2, as to the parallel light rays a, b, c and d advancing as tangent lines on outer and inner circumferential surfaces of a glass bulb 6A of the light source 6 and all the parallel light rays included between the parallel light rays a and b, and c and d among the parallel light rays reflected from the reflector 7, reflection and scattering occur more strongly at the portions of the glass bulb 6A indicated with hatching than at other portions. Hence, ineffective dark portions 12 are produced, which appear as two shadow stripes on the surface of the plate.

Such a problem is present not only in a number plate lamp of the type in which the number plate 1 is illuminated from a position above the plate, but also in a number plate lamp of the type in which the number plate is illuminated from the left and right sides of the plate.

SUMMARY OF THE INVENTION

The car number plate lamp according to the present invention is intended to solve the problems described above.

In accordance with the invention, a car number plate lamp is provided having a reflector mounted in a lamp body which is three-dimensionally curved so that the entire surface of the reflector viewed in the longitudinal direction thereof curves circular-arcuately about the light source, the surface perpendicular to the longitudinal direction forms a paraboloid with the light source as the focal point, and concentric steps for refracting light from the light source toward the number plate are formed in an inner surface of a lens provided across an opening in the lamp body.

According to the present invention, the shape of the reflector is chosen and the steps are concentrically provided so that the light radiated from the light source is guided effectively toward the number plate, resulting in a substantial improvement in the illumination effect.

BRIEF DESCRIPTION OF THE DRAWINGS

FIGS. 3A and 3B show transverse sections of a first preferred embodiment of a car number plate lamp according to the present invention;

FIG. 4 is a view of the embodiment of FIG. 3 taken in the direction indicated by an arrow A in FIG. 3;

DESCRIPTION OF THE PREFERRED EMBODIMENTS

Figure 1A:
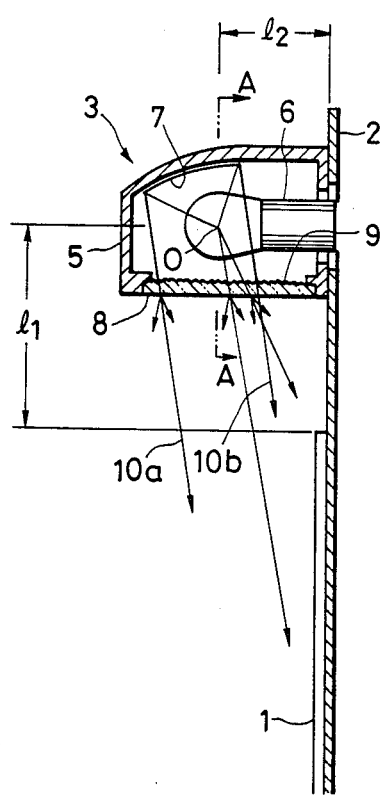
FIGS. 1A and 1B show an example of a conventional number plate lamp in a side section and a cross section taken on a line A—A in FIG. 1A, respectively.

Referring to the drawings, the present invention will now be described in detail with reference to preferred embodiments.

Figure 1B:
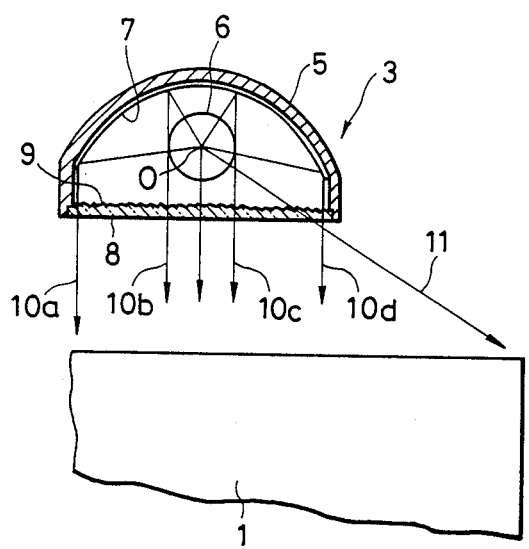
Figure 2:
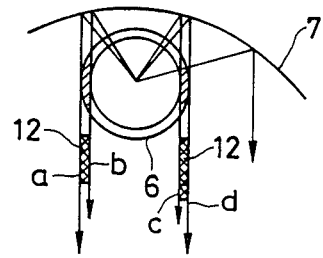
FIG. 2 is a view for explaining the generation of ineffective light portions.
Figure 5:
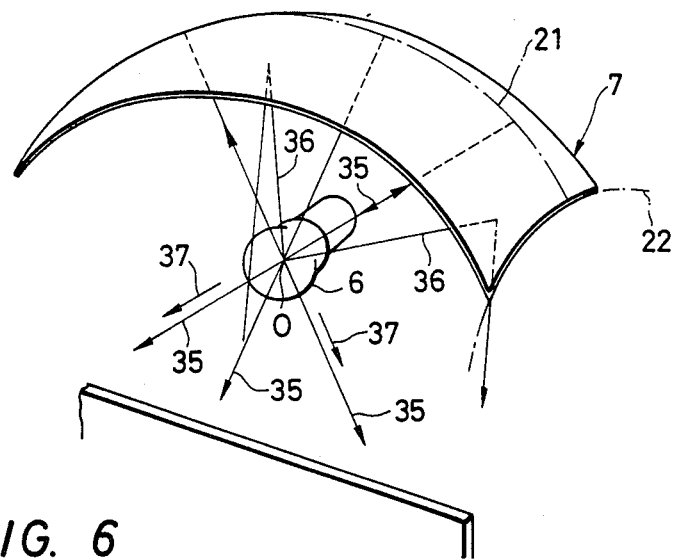
FIG. 5 is a perspective view of a reflector.

FIG. 3 is a transverse section showing a preferred embodiment of the car number plate lamp according to the present invention, FIG. 4 is a diagram viewed in the direction of an arrow A in FIG. 3, and FIG. 5 is a perspective view showing a reflector. In the drawings, the same constituent parts as those in FIGS. 1A and 1B are correspondingly referenced and a further detailed description of those parts will be omitted.

In the drawings, a number plate lamp 3 is provided on the side of a number plate 1 and arranged so that the light radiated from a light source 6 is directed towards the number plate 1 through a reflector 7 and steps 9 of a lens 8.

An inner surface 7a of the reflector 7 is formed so as to be three-dimensionally curved in such a manner that the entire surface 21 of the reflector viewed in the longitudinal direction thereof is curved circular-arcuately about a center 0 of the light source 6, and the surface perpendicular to the longitudinal direction forms a paraboloid 22 with the center 0 of the light source 6 at the focal point thereof. Thus, the inner surface 7a provides a semicircular shape in front view and a partial paraboloid of revolution inside view.

Being three-dimensionally curved in this manner, the reflector 7 has two axes of rotation so that the reflector 7 has two focal points with respect the respective axes of rotation. The conventional reflector composed of a parabolied of revolution as shown in FIGS. 1A and 1B has only one focal point. In this preferred embodiment, accordingly, one focal point $S_1$ of the two is made to coincide with the center 0 of the light source 6 on an axis of rotation $L_1$ parallel to the number plate 1. The other focal point $S_2$ is located at a position separated from the light source 6 toward the rear of the car body on an axis of rotation $L_2$ which is perpendicular to the number plate 1 and which passes through the focal point $S_1$. Being reflected from the reflector 7, the horizontal components of the light radiated from the light source 6 advance toward the lens 8 in the form of parallel light rays because the focal point $S_1$ and the center 0 of the light source 6 coincide with each other. On the other hand, being reflected from the reflector 7, the vertical components of the light advance toward the lens 8 while vertically spreading because the focal point $S_2$ and the center 0 of the light source 6 do not coincide with each other.

The lens 8 is slantingly mounted so that the lens 8 slants downward toward the number plate 1. Steps (Fresnel cuts) 9 provided in the inner surface of the lens 8 are composed of a number of concentrically formed sawtooth steps. A center $0_1$ of the steps 9 is on an extension of the inner surface of the lens 8 and at a position displaced toward the number plate 1, that is, toward the car body 2, by a predetermined distance from a position P nearest to the light source 6. The step angles $\theta$ of most of the steps 9 are stepwise or continuously reduced as the steps 9 get further from the car body 2, and an incident surface 25 of each of the steps 9 forms a concave.

In such an arrangement, of the light reflected by the reflector 7, all the light rays 35 reflected at points on the circularly arcuate surface 21 viewed in the longitudinal direction of the reflector 7 return to the light source 6 along a return path which is the same as the forward path of the light radiated from the light source 6 because the surface 21 forms a circular arc about the center 0 of the light source 6. On the other hand, all the light rays 36 reflected from the paraboloid, except the circularly arcuate surface 21, are parallel light rays which advance toward the lens 8. The light rays 36 reflected at points on the circularly arcuate surface 21 viewed in the longitudinal direction 21 and transmitted through the light source 6 form a single bright beam because the reflected light rays are perpendicularly incident to and transmitted through the surface of the glass bulb of the light source 6. The beam, which may be termed a projection line of the circularly arcuate surface 21, forms a straight line parallel to the number plate 1.

Although in the conventional device thin belt-like ineffective portions 12 are present owing to the glass bulb because the reflecting surface of the reflector was strictly a paraboloid of revolution, since the entire surface of the reflector 7 viewed in the longitudinal direction is formed in the shape of a circular arc according to the present invention, the light rays reflected from the surface 21 follow a single bright line, and no ineffective portions are produced by the glass bulb.

If the steps 9 of the lens 8 are concentrically formed, light rays 39 advancing in the directions shown by arrows B as shown in FIG. 4 and contributing nothing to the illumination of the number plate 1 are reflected inwards at the steps so as to illuminate both the opposite end portions of the number plate 1.

As a result, the light radiated from the light source 6 can be effectively used, no shadows are generated, and the number plate 1 is uniformly and brightly illuminated over its entire surface, thus greatly improving the illuminating effect. Further, because the incident surfaces 25 of the steps 9 are shaped in the form of a concave, the light scattering effect is large in comparison with the case of a plane, and hence stripe patterns due to interference are effectively prevented.

Figure 6:
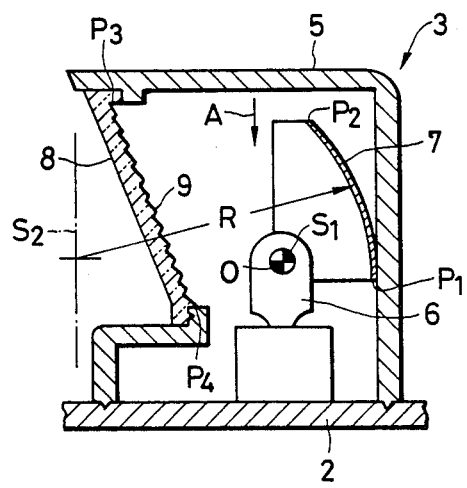
FIG. 6 is a transverse section showing another preferred embodiment of the present invention.
Figure 7:
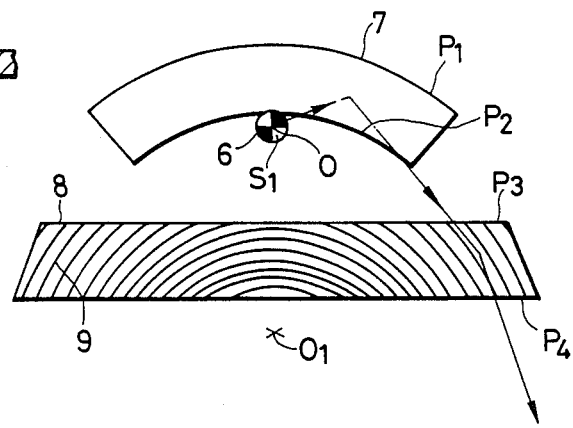
FIG. 7 is a view of the embodiment of FIG. 6 viewed in the direction indicated by an arrow A in FIG. 6.

FIG. 6 is a cross-sectional view showing another preferred embodiment of the present invention, and FIG. 7 is a view of the same embodiment viewed in the direction indicated by an arrow A in FIG. 6. In this embodiment, a radius of curvature R of a circularly arcuate surface 21 of a reflector 7 is made large so that the reflector is fabricated in the form of a slender belt.

As described above, in the car number plate lamp according to the present invention, the reflector is three-dimensionally curved so that the entire surface of the reflector viewed in the longitudinal direction is made circularly arcuate about the light source, and the surface viewed in the direction perpendicular to the longitudinal direction is made paraboloic, whereby the generation of ineffective light beam portion due to the presence of the bulb is prevented. Further, the steps of the lens are concentrically formed so that the light radiated from the light source is effectively refracted toward the number plate, whereby loss of light is prevented. As a result, it is made possible to illuminate the number plate uniformly over its entire surface, improving the overall effect of illumination, and facilitating the reading of the number plate.

What is claimed:

1. A car number plate lamp comprising:
a lamp body, a light source provided in said lamp body, a reflector provided in said lamp body, and a lens provided across an opening portion of said lamp body, said reflector being three-dimensionally curved so that the entire surface of said reflector viewed in the longitudinal direction thereof curves circular-arcuately about said light source, and the surface perpendicular to said longitudinal direction forms a paraboloid with said light source at a focal point thereof, concentric steps for refracting light from said light source to a number plate being formed in an inner surface of said lens.

2. The car number plate lamp according to claim 1, wherein a center of said steps is displaced toward said number plate from a shortest line between said front lens and said light source.

3. The car number plate lamp according to claim 1, wherein step angles of said steps decrease in a direction away from said number plate.

4. The number plate lamp according to claim 3, wherein said steps angles decrease in a continuous manner.

5. The number plate lamp according to claim 3, wherein said step angles decrease in a stepwise manner.

6. The car number plate lamp according to claim 1, wherein an incident surface of each of said steps is concave.

* * * * *